July 26, 1966  T. G. B. BOYDELL  3,263,084
OPTICAL SENSING SYSTEM

Filed Aug. 10, 1959  2 Sheets-Sheet 1

INVENTOR
Timothy G.B. Boydell
BY
Stevens, Davis, Miller & Mosher
ATTORNEY

July 26, 1966  T. G. B. BOYDELL  3,263,084
OPTICAL SENSING SYSTEM
Filed Aug. 10, 1959  2 Sheets-Sheet 2

INVENTOR
Timothy G.B. Boydell
BY
Stevens Davis Miller & Mosher
ATTORNEY

United States Patent Office 3,263,084
Patented July 26, 1966

3,263,084
OPTICAL SENSING SYSTEM
Timothy Gordon B. Boydell, Bolton, Lancashire, England, assignor to Hawker Siddeley Dynamics Limited, Hatfield, England
Filed Aug. 10, 1959, Ser. No. 832,868
Claims priority, application Great Britain, Aug. 11, 1958, 25,801/58
2 Claims. (Cl. 250—203)

This invention relates to optical radiation sensing system for deriving signals indicative of the position of a target source of radiations including a target image forming optical system. The invention is applicable to guided missiles and the missile to which the present invention is applied includes a homing head consisting of a transparent nose piece through which infra-red radiations from the target are optically projected into a sensing system which centralises the target in the field of view and indirectly operates the control surfaces of the missile to thereby bring and maintain the missile on target. The transparent nose piece although of any suitable shape, is preferably built up of a plurality, for example, eight, optically flat transparent segments, the nose being therefore of octagonal pyramid shape.

The sensing system is capable of a limited universal angular movement, the sensing system containing a detector into which the infra-red radiations are directed, the sensing system taking the form of a self-contained unit mounted in gymbals preferably as shown in the drawings accompanying my co-pending patent application No. 824,137, filed June 30, 1959.

The invention, although applicable to surface to air guided missiles, is particularly applicable to guided missiles of the air to air type which are intended to be carried by and released from aircraft and are directed against aircraft targets.

The problem with which the present invention is concerned is the generation of an appropriate signal which, when received by the sensing system, will give an accurate indication of the position of the target in the field of view of the missile, and in the form of a signal which can be used to centralise the target in the field of view and maintain the missile on target.

It will be appreciated that the total radiation emanating from the field of view will be many times greater than that from the target. Furthermore, the field of view as a whole will not in most cases be uniformly illuminated, i.e. the radiations emanating from the field of view may vary throughout the area of the field of view.

The invention is concerned with the provision of a graticule rotatably mounted in the focal plane of the target image forming optical system, the graticule comprising alternate radiation transmitting and radiation non-transmitting areas emanating from the centre of the graticule and directed outwardly from the centre towards its circumference, the angular width of the areas progressively varying throughout in the direction of rotation to produce a frequency modulated signal, the phase of modulation of the signal obtained being determined by the angular positioning of the target image on the surface of the graticule.

According to the invention the angular width of each area progressively varies also radially to a circular limit, beyond which the angular width of each area remains constant. Thus the frequency deviation is determined by the radial deviation of the target image up to a predetermined image deviation, beyond which a constant maximum frequency deviation is obtained.

Radiation in the field of view reaches a radiation detector via the transparent segments of the graticule, which is designated such that the total area through which radiation may pass remains unaltered when it is rotated, although the sections of the field of view seen by the detector will vary, the graticule being carried by the sensing unit so that it partakes of its limited universal movement.

In this way no A.C. signal will be obtained from an evenly illuminated field of view, but small brighter (or darker) regions in the field of view will be chopped and produce a signal. Where there is an uneven field of view some spurious signal will be obtained, and, generally, if the intensity distribution is relatively simple (compared with the chopper pattern), this signal will be proportional to the area of a single segment, and it is therefore advantageous to make the segments as small as possible. On the other hand the signal from a "target" source in the field of view, depends upon efficient chopping of images of that particular size, and this sets an upper limit on the graticule subdivision.

If, further, the position of the "target" source in the field of view is required, e.g. to obtain homing or guidance information, then the type of modulation must be unique to each part of the field. The frequency modulation chopper is designed to produce this type of information bearing modulation.

The chopper consists of a pattern of alternate "black" and "white" blades, where "black" and "white" are used as relative terms referring to the transmission of the blades, and this pattern rotates about a fixed point which is also the root, or origin, of the blades. As the chopper rotates, the target image is chopped by the blades at that particular radial distance. If now the blade edge spacings are not uniform but vary in a regular manner around that annulus, a frequency modulated output will be obtained, and the phase of the modulation will be determined by the angular position of the image on the chopper. If, in addition, the depth of modulation, or the nature of the modulation, is varied as the radial distance is varied this co-ordinate also can be uniquely represented in the output waveform.

A chopper can be designed to produce in this way, independent and unambiguous information on the $r$, $\theta$ co-ordinates of an image if the following points are observed:

(1) The average output frequency is a fixed multiple of the chopper rotational frequency (i.e. a fixed number of black-white blade pairs in 360° of the chopper at all values of $r$).

(2) The frequency modulated output is periodic with repetition frequency equal to the chopper rotational frequency.

(3) The phase of the signal is constant as radial distance is varied (i.e. the datum line is a straight radial line).

(4) The depth of modulation, or change in nature of the modulation, is a continuous single valued function of the radius.

(5) Blade widths are sufficient to chop the image.

(6) For efficient background elimination the complete chopper pattern must be in the field of view.

Multi-period choppers can be designed to produce the same information. These have a number, say $n$, repeats of pattern per 360° of the chopper and a field of view restricted to a maximum of $360/n$ degrees on the chopper.

Referring to the accompanying drawings.

Figure 1:
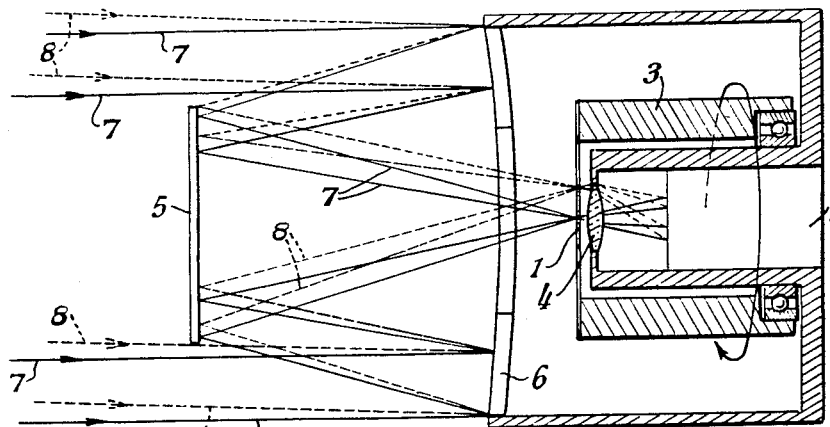
FIGURE 1 is a sectional view showing diagrammatically the operation and positioning of a chopper in accordance with the invention in relation to the sensing head of a guided missile.

Referring in the first case to FIGURE 1, the chopper 1 is mounted co-axially with and in front of the detector 2, the chopper being carried by a rotor 3 revolvable about bearings, the rotor being driven at a suitable speed and in any suitable way.

Mounted between the chopper 1 and the detector 2 is the field lens 4 of a reflecting telescope, the mirrors of which are indicated by reference numerals 5 and 6.

As will be seen from FIGURE 1, rays 7 emanating from a target in the field of view and lying parallel to the optical axis will be reflected by mirrors 5 and 6 through the ineffective centre of the chopper and through the field lens 4 into the detector 2, these rays being shown by full lines. As in this case the missile is on target the chopper will be ineffective and no signal will be given to the detector.

On the other hand rays 8 indicated by dotted lines and lying at (in the example shown) 2½° to the optical axis will pass through the effective part of the chopper, in this case near its periphery and consequently a signal will be passed to the detector to actuate the directional control mechanism of the missile to bring it on target.

Figure 2:
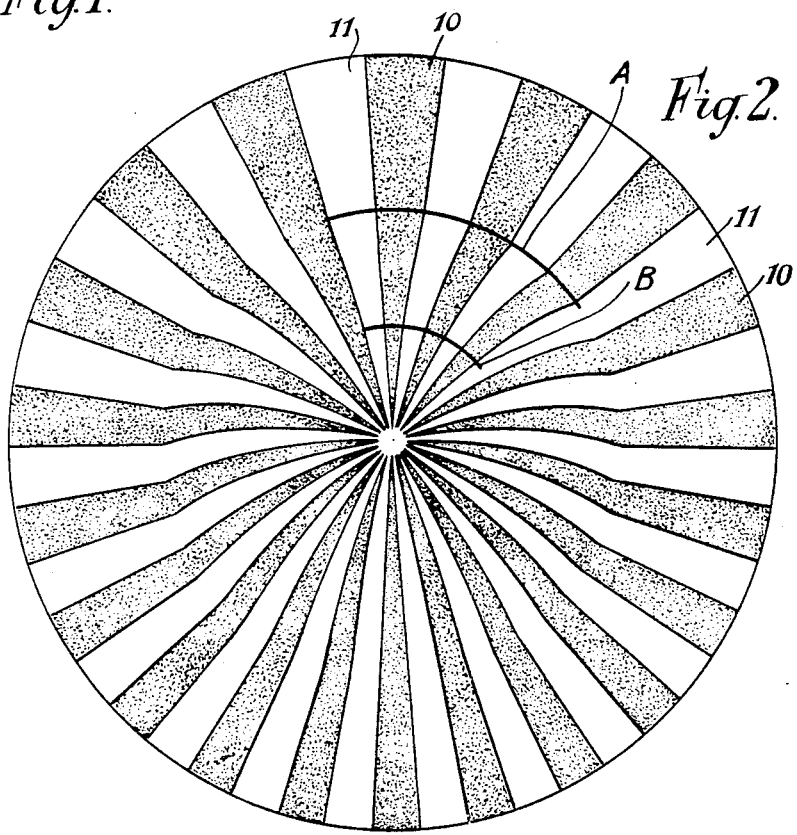
FIGURE 2 is a plan view of one form of chopper.

FIGURE 2 illustrates one form of chopper in the form of a graticule 9 built up of twenty pairs of "black" and "white" blades 10 and 11, the terms "black" and "white" being used as relative terms referring to the transmission of the blades. At the centre the blades are of equal angular width i.e. the width of the blades along an arc subtend equal angles at the centre. The angular widths of the blades vary outwardly to the arc A. Maximum variation occurs in the top and bottom blades in FIGURE 2, the variation in the topmost blade being an increase and in the bottommost a decrease. The rates of variation of angular width of the blades between the topmost and bottommost blades progressively vary.

From the arc A outwardly there is no change of angular width of individual blades. Therefore there is no further radial deviation information but bearing information is obtained by the phase of modulation of the signal.

Figure 3:
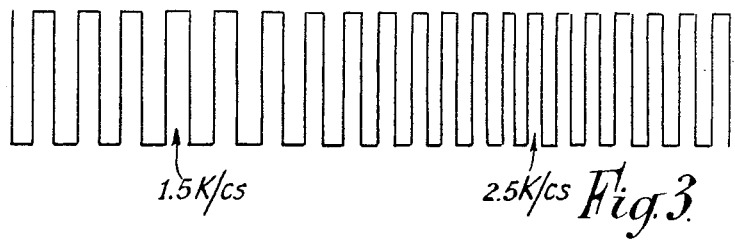
FIGURES 3 and 4 illustrate the outputs respectively at two positions of radial deviation indicated in FIGURE 2.
Figure 4:
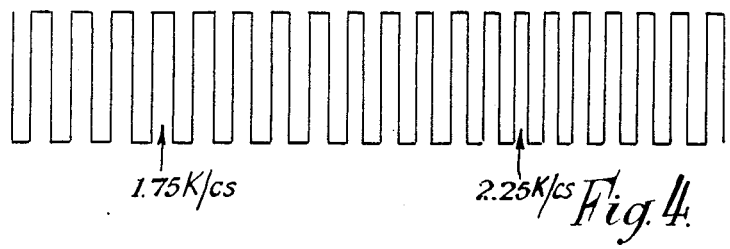

FIGURES 3 and 4 indicate diagrammatically the signal outputs obtainable with such a chopper when intercepting a ray at alternative points A and B on the surface of the graticule.

Figure 5:
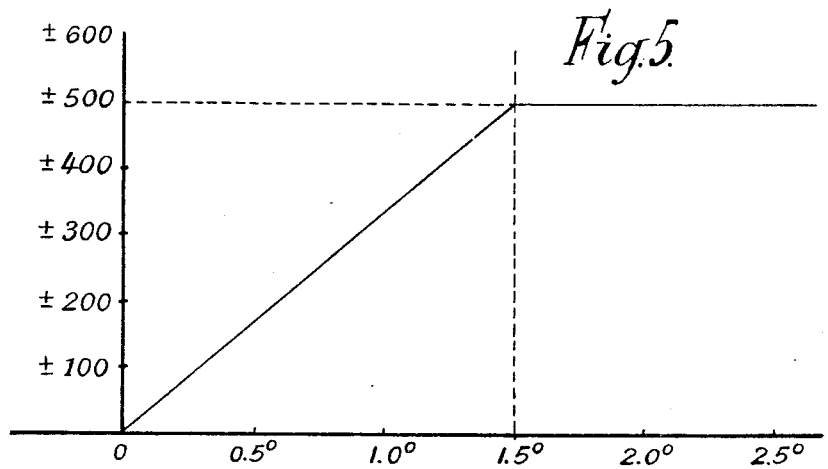
FIGURE 5 is a graph of the output comparing the frequency deviation with the radial deviation.

FIGURE 5 shows graphically how the frequency deviation increases with an increase in angular deviation of the missile off target. Maximum frequency deviation occurs at a radial deviation of 1.5°, equivalent to arc A.

Degenerate choppers which do not satisfy all the points given above can also be designed to produce limited information on the target co-ordinates. Such choppers may have, for example:

(a) The field of view restricted to only a part, of the chopper, e.g. "off-set" chopper centre.

(b) The chopper pattern restricted to a part of the field of view.

(c) A depth of modulation vs. radius relationship not single-valued, etc.

These choppers have the common property that target position information is obtained by the principle of blade edge spacing modulation, and the family of these choppers is here called F.M. choppers.

The information derived from these choppers is in the form of a frequency modulated signal which contains the required parameters in its depth, or style, of modulation and in its phase of modulation.

The outstanding advantages of this type of chopper over amplitude modulated choppers are briefly:

(1) Information coding is performed by the chopper only in an exact and predetermined manner. No spurious coding is produced by the fall in optical efficiency with angle-off (i.e. *r* coordinate), or by obscurations in the field of view, or by uneven cell response; and (2) The frequency modulated signal may be electrically limited to obtain satisfactory operation over a very wide range of target strengths, and against a rapidly varying target.

It will be appreciated that a blade having equal angular widths throughout its length need not have straight radial edges but may have curvilinear edges.

I claim:

1. In an optical radiation sensing system for deriving signals indicative of the position of a target source of radiations including a target image forming optical system, a graticule rotatably mounted in the focal plane of the target image forming optical system and comprising alternate radiation transmitting and radiation non-transmitting areas emanating from the centre of the graticule and directed outwardly from the centre towards its circumference, the angular width of the areas progressively varying throughout in the direction of rotation to produce a frequency modulated signal, the phase of modulation of the signal obtained being determined by the angular positioning of the target image on the surface of the graticule, and the angular width of each area progressively varying also radially to a circular limit, beyond which the angular width of each area remains constant, whereby the frequency deviation is determined by the radial deviation of the target image up to a predetermined image deviation, beyond which a constant maximum frequency deviation is obtained.

2. In an optical radiation sensing system for deriving signals indicative of the position of a target source of radiations including a target image forming optical system, a graticule rotatably mounted in the focal plane of the target image forming optical system, and comprising alternate radiation transmitting and radiation non-transmitting areas emanating from the centre of the graticule and directed radially outwardly from the centre towards its circumference, the angular width of the areas progressively varying throughout in the direction of rotation to produce a frequency modulated signal, the phase of modulation of the signal obtained being determined by the angular positioning of the target image on the surface of the graticule, and the angular width of each area progressively varying also radially to a circular limit, beyond which the angular width of each area remains constant, whereby the frequency deviation is determined by the radial deviation of the target image up to a predetermined image deviation, beyond which a constant maximum frequency deviation is obtained.

References Cited by the Examiner

UNITED STATES PATENTS

| | | | |
|---|---|---|---|
| 2,678,581 | 5/1954 | Reisner | 250—233 X |
| 2,820,906 | 1/1958 | Miller | 244—14.3 |
| 2,877,356 | 3/1959 | Iddings | 250—233 X |
| 2,911,167 | 11/1959 | Null et al. | 102—50 X |
| 2,931,912 | 4/1960 | Macleish | 250—233 X |
| 2,942,118 | 6/1960 | Gedance | 250—233 X |
| 2,967,247 | 1/1961 | Turck | 250—203 |

FOREIGN PATENTS 1,087,838   9/1954   France.

BENJAMIN A. BORCHELT, *Primary Examiner.*

ARTHUR M. HORTON, SAMUEL FEINBERG, SAMUEL BOYD, *Examiners.*

D. H. WARD, L. L. HALLACHER, W. C. ROCH, *Assistant Examiners.*